Patented Dec. 2, 1924.

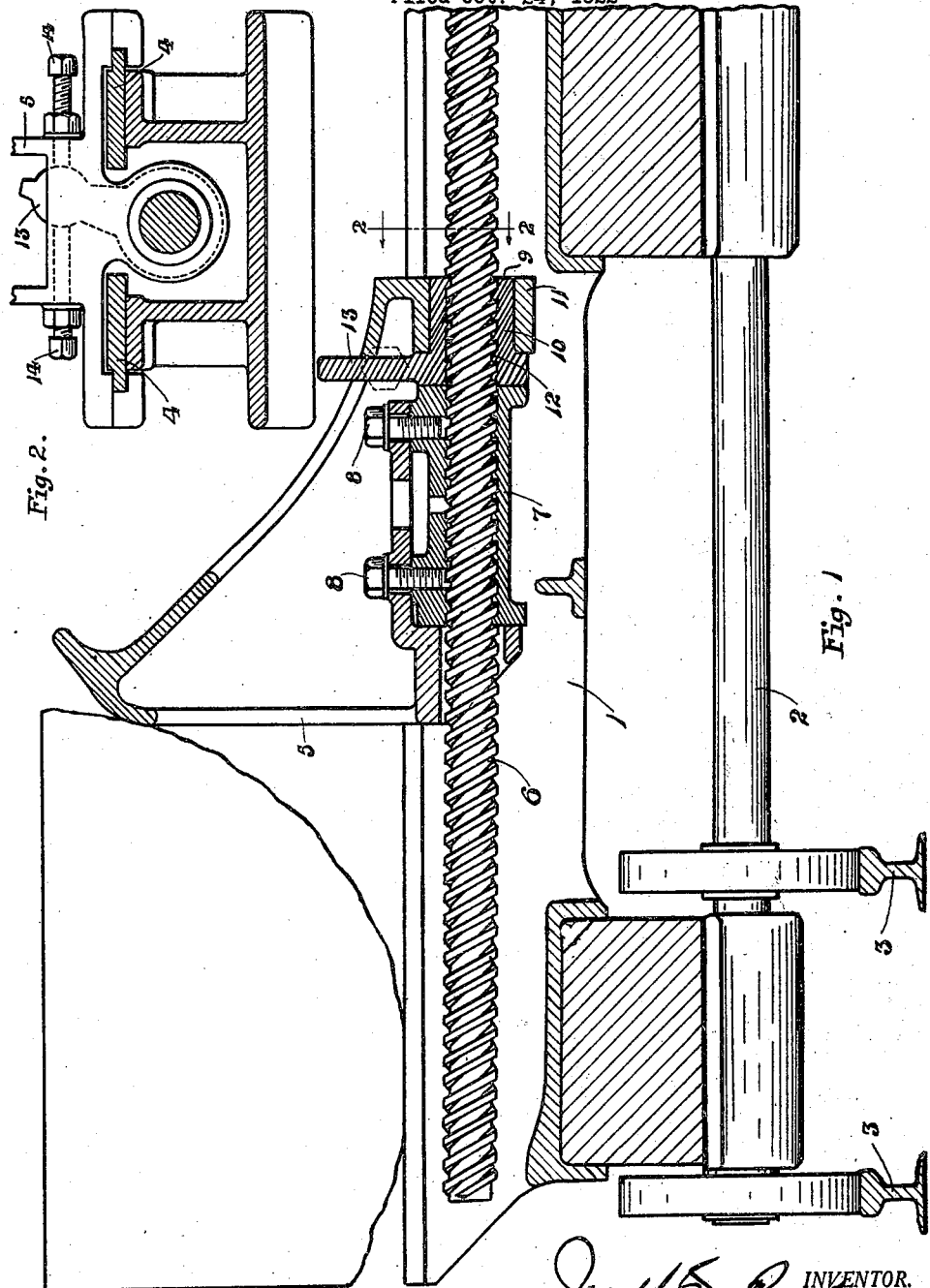

1,518,110

UNITED STATES PATENT OFFICE.

JOSEPH S. REID, OF OLEAN, NEW YORK, ASSIGNOR TO CLARK BROTHERS COMPANY, OF OLEAN, NEW YORK, A CORPORATION OF NEW YORK.

SAWMILL-CARRIAGE KNEE.

Application filed October 24, 1922. Serial No. 596,541.

*To all whom it may concern:*

Be it known that I, JOSEPH S. REID, a citizen of the United States, residing at Olean, in the county of Cattaraugus and State of New York, have invented certain new and useful Improvements in Sawmill-Carriage Knees, of which the following is a specification.

This invention relates to saw mill carriages and especially to the construction of the knees of the carriage, the object being to provide means of adjustment between the knee and feed screw adapted to actuate the knee.

In sawmills where very large logs are sawn, the knees of the log carriage are moved in and out by long screws located inside the knee base and engaging a nut fastened to the underside of the knee. These screws are rotated by gears, usually mitre gears in connection with a shaft lengthwise of and at the rear of the log carriage which shaft is rotated in one direction to move the knee and the log outwards, and is rotated in the opposite direction to recede the knees; these motions being controlled by suitable mechanism called a set works. The screws are made of steel or iron and the nuts of a less hard metal, usually bronze, sometimes brass or a babbitted nut, and the knee screws usually have multiple threads.

The threads of these knee nuts must wear somewhat rapidly and eventually must be replaced by new nuts. In the meantime, because of the increasing looseness of the nuts, the knees are held less and less precisely and in consequence the timber is not sawn accurately. Also, the expense of new nuts is considerable and some time and labor is required to remove the old nuts and place the new nuts. This expensive replacement of worn nuts is a constantly reoccurring necessity.

My invention provides means for readily taking up the wear of the knee nuts. I use two nuts at each knee, one the main nut, bears against the front side of the knee screw thread and therefore is the nut that forces the knee forward (or outward) against the resistance of the log. The other nut, the auxiliary nut or recede nut, bears against the rear side of the knee screw thread and consequently is the nut that pulls the knee to the rear of the carriage or, in sawmill parlance, recedes the knee. When the carriage is new, both nuts may act equally to move the knee in or out. After wear of the threads of the nuts has occurred, the auxiliary nut is rotated slightly by the adjusting screws. The result of this rotation in the proper direction is to take out any endwise looseness of the knee nuts as a whole on the thread of the knee screw. The thrust of the thread or threads of the knee screw is revolved in the proper direction to move the knees and log outward and the thrust of the thread or threads of the knee screw coming against the thread or threads of the auxiliary nut, when the knee screw is revolved in the proper direction to move the knees inward, that is to recede.

The auxiliary nut is shown as adjusted and locked against undesired turning by two screws, but different mechanical means may be employed, so that the two nuts can be rotated or turned with reference to one another and then locked against undesired turning. Also this type of sawmill carriage is sometimes used for resawing large pieces of timber called cants, and for other lumber manufacturing and wood working purposes.

In the accompanying drawings:

Figure 1 is a transverse sectional view through the sawmill carriage and knee actuating means; and Fig. 2 is a section on line 2—2 of Fig. 1.

The numeral 1 indicates the carriage mounted upon suitable trucks 2 adapted to travel upon the tracks 3—3. Mounted to travel transversely of the carriage upon suitable ways 4 is the knee 5. Arranged beneath the knee and transversely of the carriage is the knee feed screw 6 and the numeral 7 indicates a nut provided with internal threads to receive the feed screw 6. This nut is secured to the knee by bolts 8—8. The numeral 9 indicates an auxiliary nut arranged between the outer end of the knee and the end of the main nut 7. This auxiliary nut 9 is provided with a sleeve 10 received in the bearing 11 arranged in the outer end of the knee. Internal threads 12 of the auxiliary nut 9 are slightly less in thickness than the width of the groove of the screw threads on the feed screw 6 and adapted to bear against the rear side of the feed screw threads, the auxiliary nut consequently being the nut that pulls the knee to the rear of the carriage when the knee recedes. Extending upwardly from the nut is an arm 13 and arranged at the base of the knee are two transverse adjustment screws 14—14, the inner ends of which contact with the arm 13. When it is desirable to take up the wear between the feed screw and the main threaded nut 7, the arm 13 is turned in the desired direction and held in its adjusted position by means of the adjustment screws 14—14, being locked in the adjusted position against turning by the screws.

It is obvious that other means may be provided for holding the auxiliary nut in its adjusted position.

It will thus be seen that I have provided a means whereby the wear occasioned between the feed screw 6 and the main nut 7 may be taken up readily thereby disposing of the necessity of renewing these nuts at intervals, furthermore effecting an accurate movement of the knees insuring an exact movement of the several knees used upon the carriage, thereby effecting more accurate work of the sawmill.

I claim:

The combination of a log carriage knee, a feed screw, a stationary nut screwed thereon, bolts for fastening the stationary nut to the knee, a rotatable auxiliary nut arranged between the outer end of the knee and the stationary nut and abutting against the stationary nut, the nuts tending to push in opposite directions for taking up wear on the threads of the screw, the rotatable nut having a sleeve received in a bearing in the outer end of the knee, an arm extending upwardly from the rotatable nut, and adjusting screws in position to move the arm for taking up wear on the feed screw.

In testimony whereof I affix my signature.

JOSEPH S. REID.